United States Patent [19]

Dalessandro

[11] Patent Number: 4,786,420
[45] Date of Patent: Nov. 22, 1988

[54] SELF-CLEANING WATER FILTER SYSTEM

[76] Inventor: Lawrence C. Dalessandro, 278 Roosevelt St., Exeter, Pa. 18643

[21] Appl. No.: 95,226

[22] Filed: Sep. 11, 1987

[51] Int. Cl.[4] .......................................... B01D 23/24
[52] U.S. Cl. ................................. 210/791; 210/806; 210/252; 210/323.2; 210/332; 210/353; 210/409; 55/343
[58] Field of Search ................. 55/342, 343; 210/323, 210/288, 252, 332, 335, 353, 407, 409, 451, 452, 458, 201, 806, 791

[56] References Cited

U.S. PATENT DOCUMENTS

| | | |
|---|---|---|
| 526,695 | 10/1894 | Emery .................................. 210/252 |
| 605,046 | 5/1898 | Johnston . |
| 652,966 | 7/1900 | Jandus . |
| 989,965 | 4/1911 | Harloe . |
| 1,013,435 | 1/1912 | Pfautz ................................. 210/252 |
| 1,271,681 | 7/1918 | Duryea . |
| 1,942,584 | 1/1934 | Weinstein ........................... 210/335 |
| 2,082,847 | 6/1937 | Petty .................................. 210/201 |
| 3,478,497 | 11/1969 | Doig et al. ........................... 55/411 |
| 3,897,228 | 7/1975 | Berz .................................. 55/343 X |

Primary Examiner—Charles Hart
Attorney, Agent, or Firm—David A. Tamburro

[57] ABSTRACT

A self-cleaning water filter system for a household or the like having a plurality of water usage zones requiring varying water quality.

13 Claims, 1 Drawing Sheet

SELF-CLEANING WATER FILTER SYSTEM

BACKGROUND OF THE INVENTION

This invention relates generally to a water filter system and, more particularly, to a self-cleaning water filtering system and method especially useful in a household, restaurant, office building, or the like having modern plumbing facilities.

Today, water supply systems are frequently contaminated with such elements such as dirt, rust, and other sediment, chlorine, Giardia Lambia cysts, etc. Many type filters have been proposed for cleaning the water, especially for making it suitable for drinking purposes. Most commonly used are in-line cartridge type filters, several of which are usually arranged in series for progressively finer filtration necessary to provide water suitable for drinking and cooking purposes. An average household may use about 200 gallons of water per day, and all that water passes through all the filters. As a result, these filters require frequent manual cleaning and replacement, e.g. every four to six weeks, and consequently are terribly inconvenient and expensive.

Most household systems are closed water systems and there are various zones of water usage requiring various degrees of filtration. For example, a first zone servicing toilet closets may use unfiltered water as received from the supply source. A second zone servicing laundry appliances or bathing facilities may need water filtered only for dirt, rust, and other sediment, e.g. 20 micron. A third zone servicing a kitchen and food washing outlet may need water which is filtered for finer dirt and sediment, e.g. 5 micron, and for odor and chlorine removal. A fourth zone which provides pure drinking and cooking water often needs filtration to 1 micron for the removal of fine sediment and Giardia Lambia cysts.

As mentioned, the conventional manner of passing all the water through a number of serially arranged filters is inconvenient and expensive. Thus, a need clearly exists for a water filtering system for a household which is not only capable of providing water of suitable quality at the various service zones, but also is conveniently and economically maintained over an extended period of time, e.g. one year or more.

SUMMARY AND OBJECTS OF THE INVENTION

Accordingly, the primary object of this invention resides in the provision of a novel self cleaning filtering system and method for purifying the water supply in a household or the like.

Another object of the invention resides in the provision of a novel self cleaning water filtering system for a household or the like, the system providing water of different quality at various zones of usage within the household.

Another object of the invention resides in the provision of a novel, self cleaning, water filtering system comprising a plurality of cartridge-type filter units connected in series to sequentially filter the water passing therethrough, with each unit having a flushing outlet connected to a respective service zone such as a toilet closet, laundry machine, etc. As water is used at each service zone, the filter unit associated therewith is automatically flushed and cleaned.

Still another object of the invention resides in the provision of the above novel water filtering system for a household, whereby the filtering units are frequently automatically flushed and cleaned throughout the day as water is drawn at the various service zones in the house.

Another object of the invention resides in the provision of the novel self cleaning water filtering system described above, wherein only the pure drinking and cooking water is passed through all the filter units, thus extending the life of the filter units, particularly the fine filter units.

A further object of the invention resides in the provision of the above novel water filtering system, wherein the filtering units require virtually no manual attention and the effective serviceable life of the units is greatly extended.

Other objects and advantages of the invention will become apparent from reading the following detailed description of the invention wherein reference is made to the accompanying drawing in which like numerals indicate like elements.

DETAILED DESCRIPTION OF THE INVENTION

Figure 1:
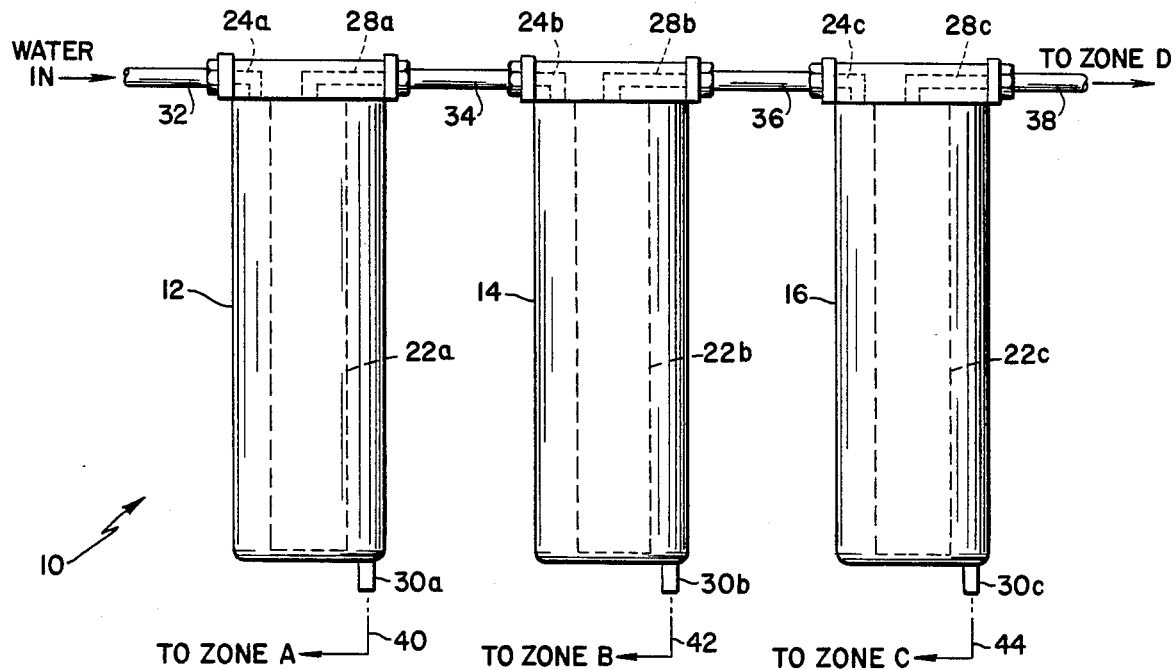
FIG. 1 is a fragmentary schematic view of the novel filtering system of the invention.
Figure 2:
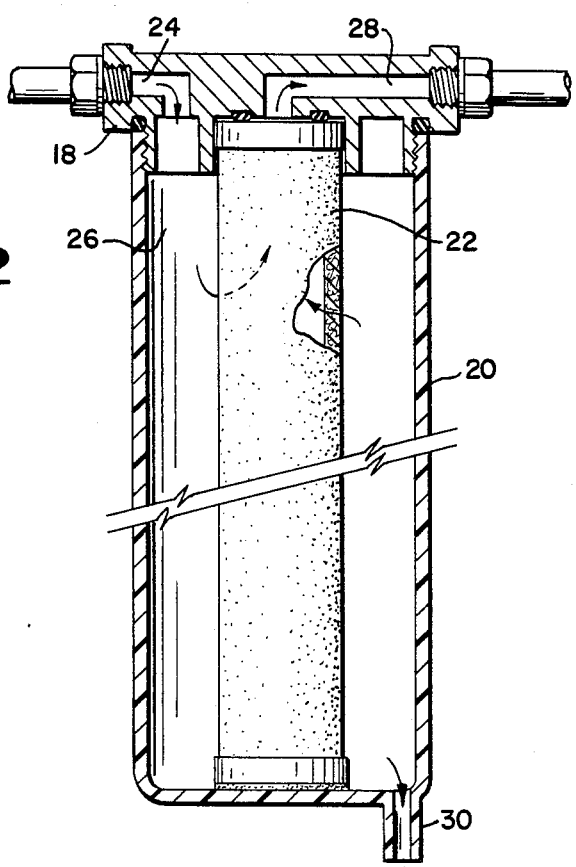
FIG. 2 is a partially sectioned fragmentary view of a typical cartridge type filter employed in the system of the invention.

Referring now to the drawings, the water filter system 10 of the invention includes a plurality of cartridge type filters 12, 14, and 16 connected in series, each filter having a cap 18, a removable housing or sump 20, and a cylindrical filter element or cartridge 22 mounted within the sump. Water passes through an inlet passageway 24 in cap 18 into the annular area 26 surrounding the outer surface of element 22, through the element and out through outlet passageway 28 in cap 18. flushing outlet 30 is provided at the bottom of sump 20 in communication with the incoming water in annular area 26.

With the exception of flushing outlet 30, filters 12, 14, and 16 are of standard commercial construction. For example, filter 12 may be an Ametek model HD-10-R50 with a 20 micron filter cartridge 22a to remove sand, silt, rust, sludge, and scale. Filters 14 and 16 may both be an Ametek model PS, but with different cartridges. Filter 14 is provided with a 5 micron Ametek activated carbon Cl cartridge 22b to remove foul odors, taste of chlorine, and sediment. Filter 16 is provided with a 1 micron Ametek CRE-1 ceramic cartridge for removing Giardia Lambia cysts and very fine sediment.

Operation of my filtering system and method will now be described as it pertains to a modern household plumbing system having various usage zones, A, B, C, D requiring various degrees of filtration. Water is furnished to the house via supply line 32 connected to inlet 24a of filter 12. Conduit 34 connects outlet 28a of filter 12 to inlet 24b of filter 14, and conduit 36 connects outlet 28b of filter 14 to inlet 24c of filter 16. Conduit 38 delivers the pure fine filtered water from outlet 28c of filter 16 to drinking Zone D.

Conduit 40 connects flushing outlet 30a of filter 12 to Zone A which may a toilet closet capable of using unfiltered water. Conduit 42 connects flushing outlet 30b to Zone B servicing laundry appliances and bathing facilities which require some filtration, e.g. for dirt and sediment. Conduit 44 connects flushing outlet 30c to Zone C which services a kitchen and food washing station that require better quality water filtered for dirt, sediment, foul odor, and chlorine. Conduit 38 connects outlet 28c to Zone D which provides pure filtered water for drinking and cooking purposes.

In a normal household a total of about 200 gallons of water per day may be used. Zones A and B use about 80 gallons each, Zone C uses about 30 gallons, and Zone D uses about 10 gallons. Thus, of the total 200 gallons, 120 gallons will pass through the 20 micron cartridge 22a of filter 12, 40 gallons will pass through the 5 micron cartridge 22b of filter 14, and only 10 gallons will pass through the 1 micron cartridge 22c of filter 16. Consequently, the effective serviceable life of the filters, particularly the finer filters 14 and 16, is greatly extended due to the fact that only the specific volume of water required for a specific zone is filtered for that zone.

In addition, each time a toilet is flushed at Zone A, the incoming unfiltered water from inlet 24a passes downwardly around the outer filtering surface of cartridge 22a in unit 12 and out flushing outlet 30a, thereby automatically scrubbing and cleaning the incoming side of the cartridge. Similarly, as water which has been filtered by unit 12 is used at Zone B, it will first pass downwardly around the outer filtering surface of cartridge 22b in unit 14 to clean the incoming side of that cartridge. Finally, as water which has been filtered by units 12 and 14 is used at Zone C it will first pass downwardly around the outer surface of cartridge 22c in unit 16 to clean that cartridge.

From the description hereinabove, it is apparent that my invention provides a water filtering system and method for a household or the like which effectively furnishes water of varying suitable quality at various service zones. Because the filters are frequently cleaned automatically by the large volumes of water routinely used at the various service zones throughout the day, the system is conveniently and economically maintained over an extended period of time, e.g. one year or more. The system is a closed system and all the water delivered to the household supply is utilized within the household. No waste water or filter back flushing to drain or sewer is required.

While the system as illustrated employs three filters, it is to be understood that additional filters as needed may be employed. Also, conventional filters other than those identified above may be utilized.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A self cleaning water filter system for use in a household or the like comprising a plurality of filter means each having a housing, a filter element within said housing, water inlet means connected to said housing on the upstream side of said element, water outlet means connected to said housing on the downstream filtered side of said element, and flushing outlet means connected to said housing on the upstream side of said element; first conduit means connecting the water outlet means of a first of said filter means to the water inlet means of a second of said filter means; second conduit means adapted to connect the flushing outlet means of said first filter means to a first water service zone which uses water of a given quality; third conduit means adapted to connect the flushing outlet means of said second filter means to a second water service zone which uses water of a better quality, whereby as water is routinely drawn from said first and second service zones the filter element of said first and second filter means, respectively, is automatically cleaned to thereby extend the effective life of the elements.

2. The filter system of claim 1, said inlet means located at one end of said housing and said flushing outlet means located at the other end of said housing, whereby as water passes from said inlet means to said flushing outlet means the incoming side of said element is cleaned.

3. The filter system of claim 1, comprising fourth conduit means adapted to connect the water outlet means of said second filter means to a third service zone which uses water of a quality better than that of the first and second zones.

4. The filter system of claim 3, said fourth conduit means being connected to the water inlet means of a third filter means; fifth conduit means adapted to connect the flushing outlet means of said third filter means to said third service zone; and sixth conduit means adapted to connect the water outlet means of said third filter means to a fourth service zone which uses water of a better quality than that of the first, secnnd, and third zones.

5. A water supply system for a household or the like comprising a plurality of water service zones utilizing water of different quality; water supply means; a plurality of filter means each having a housing, a filter element within said housing, water inlet means connected to said housing on the upstream side of said element, water outlet means connected to said housing on the downstream filtered side of said element, and flushing outlet means connected to said housing on the upstream side of said element; first conduit means connecting said water supply means to the water inlet means of a first of said filter means; second conduit means connecting the water outlet means of said first filter means to the water inlet means of a second filter means; third conduit means connecting the flushing outlet means of said first filter means to a first service zone which uses water of a given quality; fourth conduit means connecting the flushing outlet means of said second filter means to a second service zone which uses water of a better quality than that of said first zone; and fifth conduit means connecting the water outlet means of said second filter means to a third service zone which uses water of a better quality than that of said first and second zones, whereby as water is routinely used at said first and second service zones the filter element of said first and second filter means, respectively, is automatically cleaned to thereby extend the effective life of the elements.

6. The water supply system of claim 5, said fifth conduit means being connected to the water inlet means of a third filter means; sixth conduit means connecting the flushing outlet means of said third filter means to said third service zone, whereby as water is used at said third service zone the filter element of said third filter means is automatically cleaned; and seventh conduit means connecting the water outlet means of said third filter means to a fourth service zone which uses water of a better quality than that of said first, second, and third zones.

7. The water supply system of claim 6, wherein said first zone services a toilet closet, said second zone services laundry facilities, said third zone services kitchen facilities, and said fourth zone provides drinking or cooking water.

8. The filter system of claim 2, said filter element being a cylindrical filter cartridge extending between said one and other ends, said water inlet means feeding water into said one end of said housing around the outer upstream side of said cartridge, said water outlet means connected to the inner downstream filtered side of said cartridge, and said flushing outlet means drawing water from around the outer upstream side of said cartridge at the other end of said housing.

9. The water supply system of claim 5, said housing having first and second ends, said filter element being a cylindrical filter cartridge extending between said first and second ends, said water inlet means feeding water into said first end of said housing around the outer upstream side of said cartridge, said water outlet means connected to said housing for receiving water from the inner downstream filtered side of said cartridge, and said flushing outlet means connected to said second end of said housing for drawing water from the outer upstream side of said cartridge.

10. A self cleaning water filter system for use in a household or the like comprising a plurality of filter means each having a housing with first and second ends, a cylindrical filter element mounted within said housing and extending between said first and second ends, water inlet means connected to said first end of said housing for feeding water into said housing around the outer upstream side of said element, water outlet means connected to said housing for receiving water from the inner downstream filtered side of said element, and flushing outlet means connected to said second end of said housing for drawing water from around the outer upstream side of said element; first conduit means connecting the water outlet means of a first of said filter means to the water inlet means of a second of said filter means; second conduit means adapted to connect the flushing outlet means of said first filter means to a first water service zone which uses water of a given quality; third conduit means adapted to connect the flushing outlet means of said second filter means to a second water service zone which uses water of a better quality, whereby as water is routinely drawn from said first and second service zones the filter element of said first and second filter means, respectively, is automatically cleaned to thereby extend the effective life of the elements.

11. A method of filtering water to be used in a household or the like wherein a plurality of water service zones utilizes water of different quality, the method comprising providing a plurality of filter means each having a housing, a filter element within said housing, water inlet means connected to said housing on the upstream side of said element, water outlet means connected to said housing on the downstream filtered side of said element, and flushing outlet means connected to said housing on the upstream side of said element; passing water to the water inlet means of a first filter means; passing water from the water outlet means of the first filter means to the water inlet means of a second filter means; connecting the flushing outlet means of the first filter means to a first service zone which uses water of a given quality; connecting the flushing outlet means of the second filter means to a second service zone which uses water of a better quality than that of the first zone; and connecting the water outlet means of the second filter means to a third service zone which uses water of a better quality than that of the first and second zones; whereby as water is routinely used at said first and second service zones the filter element of said first and second filter means, respectively, is automatically cleaned.

12. The method of claim 11, connecting the water outlet means of said second filter means to the water inlet means of a third filter means; connecting the flushing outlet means of said third filter means to said third service zone, whereby as water is used at said third service zone the filter element of said third filter means is automatically cleaned; and connecting the water outlet means of said third filter means to a fourth service zone which uses water of a better quality than that of said first, second, and third zones.

13. The method of claim 12, wherein said first zone services a toilet closet, said second zone services laundry facilities, said third zone services kitchen facilities, and said fourth zone provides drinking or cooking water.

* * * * *